US008746603B2

(12) United States Patent
Hayashi (10) Patent No.: US 8,746,603 B2
(45) Date of Patent: Jun. 10, 2014

(54) ONE-WAY CLUTCH FOR FISHING REEL (75) Inventor: Kentaro Hayashi, Osaka (JP)

(73) Assignee: Shimano Inc., Osaka (JP)

( * ) Notice: Subject to any disclaimer, the term of this patent is extended or adjusted under 35 U.S.C. 154(b) by 270 days.

(21) Appl. No.: 13/159,973

(22) Filed: Jun. 14, 2011

(65) Prior Publication Data

US 2011/0315801 A1  Dec. 29, 2011

(30) Foreign Application Priority Data

Jun. 23, 2010  (JP) ................. 2010-142226

(51) Int. Cl.
*A01K 89/01* (2006.01)

(52) U.S. Cl.
USPC ........... 242/300; 242/295; 242/298; 242/299; 242/262

(58) Field of Classification Search
USPC .................. 242/295, 298, 300, 301, 257, 262
See application file for complete search history.

(56) References Cited

U.S. PATENT DOCUMENTS

| | | | | |
|---|---|---|---|---|
| 4,667,244 A | * | 5/1987 | Ishikawa | 358/498 |
| 5,921,492 A | * | 7/1999 | Bauer | 242/317 |
| 6,354,526 B1 | * | 3/2002 | Morise | 242/295 |
| 6,641,071 B1 | * | 11/2003 | Yeh | 242/317 |
| 7,077,350 B2 | * | 7/2006 | Koelewyn | 242/295 |
| 7,374,118 B2 | * | 5/2008 | Oishi et al. | 242/257 |
| 7,694,907 B2 | * | 4/2010 | Chivarov et al. | 242/303 |
| 7,721,987 B2 | * | 5/2010 | Hayashi | 242/262 |
| 2002/0063180 A1 | | 5/2002 | Matsuda et al. | |
| 2004/0265020 A1 | * | 12/2004 | Aruga | 399/329 |
| 2007/0176036 A1 | | 8/2007 | Venes | |
| 2009/0057461 A1 | * | 3/2009 | Hayashi | 242/247 |

FOREIGN PATENT DOCUMENTS

| | | |
|---|---|---|
| EP | 0155325 A1 | 9/1985 |
| JP | 2000-120730 A | 4/2000 |
| JP | 2003-79289 A | 3/2003 |
| JP | 2003-125682 A | 5/2003 |
| JP | 3438949 | 8/2003 |
| JP | 2004-350614 A | 12/2004 |
| JP | 2005-299743 A | 10/2005 |
| JP | 2005-326000 A | 11/2005 |
| JP | 2006-271397 A | 10/2006 |
| JP | 2007-205564 A | 8/2007 |
| JP | 2008-178316 A | 8/2008 |
| JP | 2008-178349 A | 8/2008 |
| JP | 2009-261368 A | 11/2009 |

OTHER PUBLICATIONS

Extended European Search Report of the corresponding European Application No. 11168338.9, dated Nov. 6, 2012.

* cited by examiner

*Primary Examiner* — Emmanuel M Marcelo
(74) *Attorney, Agent, or Firm* — Global IP Counselors (57) ABSTRACT

A one-way clutch for a fishing reel includes an outer race, an inner race, a first roller, a second roller, and a cam surface. The first roller is disposed between the outer race and the inner race, and is disposed to make contact with the outer race and the inner race. The second roller is disposed between the outer race and the inner race, and is disposed to make contact with the outer race and the inner race. The cam surface is disposed on either an inner peripheral surface of the outer race or an outer peripheral surface of the inner race, and is disposed to allow the first roller and the second roller being stuck with the cam surface. The first roller has a coefficient of friction greater than a coefficient of friction of the second roller.

10 Claims, 7 Drawing Sheets

FIG. 7

ONE-WAY CLUTCH FOR FISHING REEL

CROSS-REFERENCE TO RELATED APPLICATIONS

This application claims priority to Japanese Patent Application No. 2010-142226 filed on Jun. 23, 2010, the entirety of which is hereby incorporated by reference in its entirety.

BACKGROUND OF THE INVENTION

1. Field of the Invention

The present invention relates to a one-way clutch, particularly to a fishing reel one-way clutch using a roller.

2. Background Art

The one-way clutches are widely used for the fishing reels. In the dual-bearing reels and the single-bearing reels, for instance, a one-way clutch is attached onto a handle shaft for a drag activation purpose. In contrast, in the spinning reels, a one-way clutch is attached to a rotor for allowing and preventing reverse rotations of the rotor. In the lever brake spinning reels, a one-way clutch is attached to a rotor for allowing a brake member to rotate in response to only rotations of the rotor in a fishing line releasing direction.

For example, Japanese Patent No. 3,438,949 describes an exemplary well-known spinning reel embedded with a roller-type one-way clutch for promptly preventing reverse rotations of a rotor. The well-known one way clutch includes an outer race, an inner race, and rollers. The outer race is attached to a reel unit in a non-rotatable state. The inner race is coupled to a rotor while being unitarily rotatable therewith. The rollers are interposed between the outer race and the inner race. The well-known one-way clutch is of an inner race rotating type, and the outer race includes a cam surface on the inner peripheral surface thereof. With the cam surface, the interval between the outer race and the inner race is designed to change from a state that the interval is less than the inner diameter of the rollers to a state that the interval is greater than the inner diameter of the rollers. The roller-type one-way clutch is more advantageous than the claw-type one-way clutches in that reverse rotations of the rotor can be instantly prevented.

SUMMARY

However, the roller-type one-way clutch has a drawback that the rollers slip without properly biting into the cam surface in preventing reverse rotations of the rotor. A countermeasure may be proposed to deal with the drawback, for instance, by using rollers made of slippage reduction material with a high coefficient of friction instead of the aforementioned rollers used in the roller-type one-way clutch. However, the rollers made of slippage reduction material have low strength. This reduces allowable transmission torque of the one-way clutch. Further, drag torque is increased under a clutch-off state of the one-way clutch. An angler is accordingly required to strongly rotate the handle under the clutch-off state. Simply put, an angler may have a feeling that handle rotations are unsmooth.

In view of the above, the present invention addresses a need to produce a roller-type one-way clutch for inhibiting roller slippage without making an angler as much as possible have a feeling of unsmooth handle rotation and a one-way clutch for a fishing reel is provided. The one-way clutch for the fishing reel includes an outer race, an inner race, a first roller, a second roller, and a cam. The outer race is engaged with a first component of the fishing reel. The first component is selected from a group consisting a rotor, a reel unit, and a spool. The inner race is engaged with a second component of the fishing reel. the second component is selected from a group consisting a brake unit, the pinion gear, a handle shaft, and a drag mechanism. The first roller is disposed between the outer race and the inner race. The first roller is disposed to make contact with the outer race and the inner race. The second roller is disposed between the outer race and the inner race. The second roller is disposed to make contact with the outer race and the inner race. The cam surface is disposed on either an inner peripheral surface of the outer race or an outer peripheral surface of the inner race. The cam surface is disposed to allow the first roller and the second roller to get stuck therewith. The first roller and the second roller are disposed at a predetermined interval in a circumferential direction of the outer race. The first roller having a coefficient of friction greater than a coefficient of friction of the second roller.

BRIEF EXPLANATION OF THE DRAWINGS

Referring now to the attached drawings which form a part of this original disclosure.

DETAILED DESCRIPTION OF THE EMBODIMENTS

Entire Structure

Figure 1:
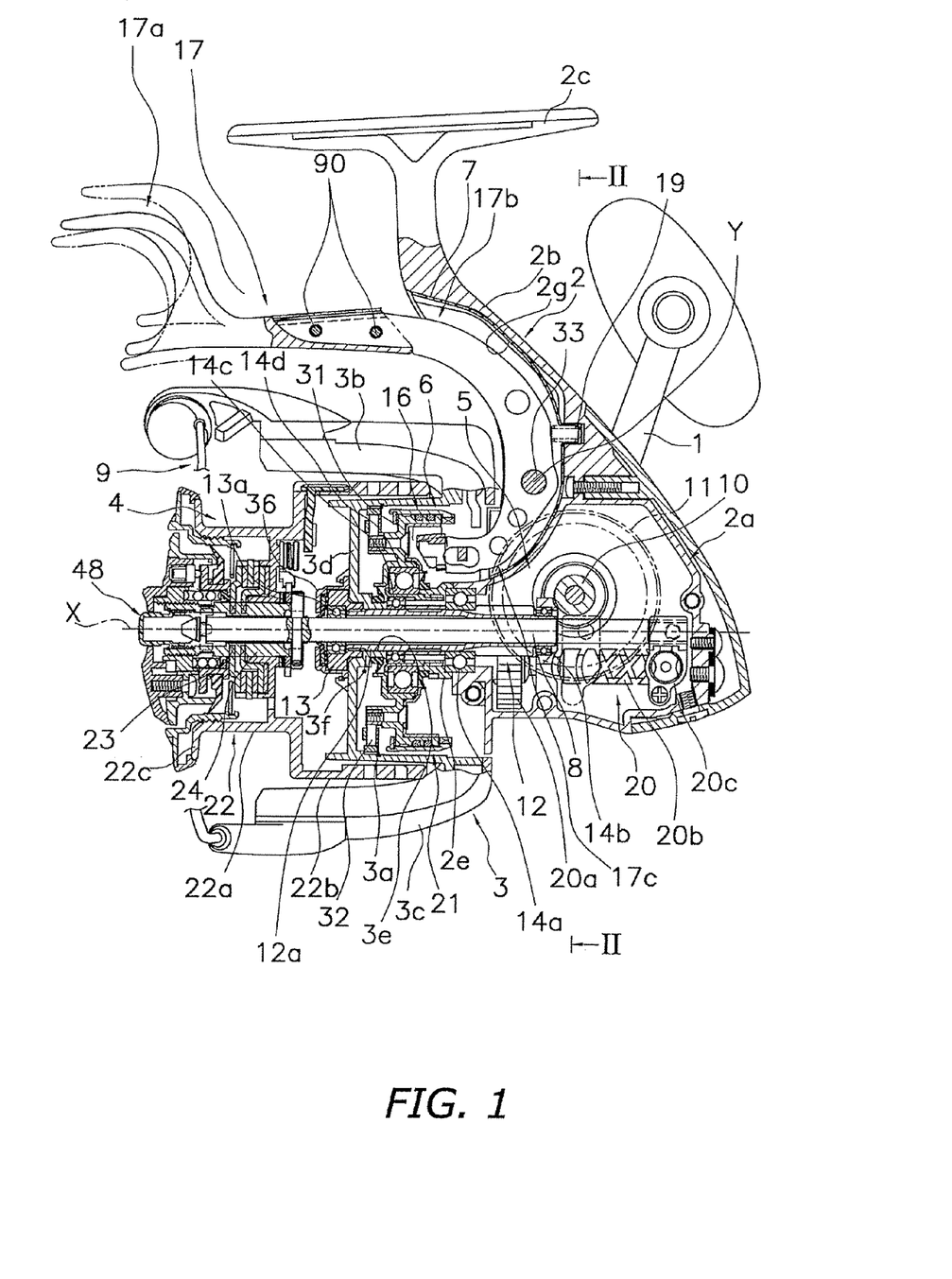
FIG. 1 is a cross-sectional side view of a spinning reel adopting a first exemplary embodiment of the present invention.

As illustrated in FIG. 1, a spinning reel adopting an exemplary embodiment of the present invention is a lever brake reel configured to wind a fishing line about a first axis X along the longitudinal direction of a fishing rod. The spinning reel includes a reel unit 2, a rotor 3 and a spool 4. The reel unit 2 includes a handle assembly 1. The rotor 3 is rotatably supported by the front part of the reel unit 2 about the first axis X. The spool 4 is disposed at the front of the rotor 3 for winding the fishing line.

The reel unit 2 is made of, for instance, magnesium alloy. The reel unit 2 includes a fishing rod attachment 2c, a reel body 2a, and a leg 2b. The fishing rod attachment 2c is a longitudinally elongated portion to be attached to a fishing rod. The reel body 2a is disposed away from the fishing rod attachment 2c. The leg 2b connects the fishing rod attachment 2c and the reel body 2a. The reel body 2a includes a mechanism attachment space in the inside thereof. The reel body 2a is laterally open and integrally formed with the leg 2b. The opening of the reel body 2a is covered with a lid member (not illustrated in figures). Further, an attachment member 2e is attached to the front part of the reel body 2a. The attachment member 2e is a metal tubular member having an attachment flange. The leg 2b includes an attachment groove 2g on the front surface thereof for containing a brake lever 17 which will be described later. The attachment groove 2g has a roughly crescent-like cross-section. A sheet member 7 is attached to the attachment groove 2g. The sheet member 7 is made of, for instance, synthetic resin insulator material (e.g., polyacetal).

The reel body 2a contains a rotor drive mechanism 5, a lever brake mechanism 6, and an oscillation mechanism 20 in the inside thereof. The rotor drive mechanism 5 is configured to rotate the rotor 3 in conjunction with the handle assembly 1. The lever brake mechanism 6 is configured to brake rotations of the rotor 3 in the fishing line release direction, i.e., reverse rotations of the rotor 3. The oscillation mechanism 20 is configured to reciprocate the spool 4 back and forth through a spool shaft 8 in conjunction with rotations of the handle assembly 1.

The rotor 3 is made of, for instance, magnesium alloy. The rotor 3 is rotatably supported by the reel unit 2. The rotor 3 includes a cylinder 3a, a first arm 3b, and a second arm 3c. The first and second arms 3b and 3c are disposed lateral to the cylinder 3a while being opposed to each other. The cylinder 3a includes a boss 3f on the center of a front wall 3d thereof. The boss 3f includes a through hole 3e. The spool shaft 8 and a pinion gear 12 which will be described later penetrate the through hole 3e. Further, a bail arm 9 is pivotably attached to the tips of the first and second arms 3b and 3c, as illustrated in FIG. 1. The bail arm 9 guides a fishing line to the spool 4.

The spool 4 is made of, for instance, aluminum alloy. The spool 4 is disposed between the first and second arms 3b and 3c of the rotor 3. The spool 4 is detachably attached to the distal end of the spool shaft 8 through a single-touch attachment/detachment mechanism 48 while being prevented from rotating. The spool 4 includes a spool body 22, a drag mechanism 23, and a spool tubular portion 24. The drag mechanism 23 is contained in the spool body 22. The spool tubular portion 24 supports the spool body 22 for allowing spool body 22 to rotate. The spool body 22 includes a bobbin trunk 22a, a skirt 22b, and a flange 22c. The bobbin trunk 22a is a tubular portion. The skirt 22b is a tubular portion formed on the rear end of the bobbin trunk 22a. The skirt 22b has a diameter greater than that of the bobbin trunk 22a. The flange 22c is a forwardly slanted portion formed on the front part of the bobbin trunk 22a.

The rotor drive mechanism 5 includes a master gear shaft 10, a master gear 11 and the pinion gear 12. The master gear shaft 10 allows the handle assembly 1 to be fixed thereto in a unitarily rotatable state. The master gear 11 is configured to rotate together with the master gear shaft 10. The pinion gear 12 is meshed with the master gear 11. The master gear shaft 10 is a tubular shaped portion integrally formed with the master gear 11. The master gear shaft 10 is rotatably supported by the reel body 2a and the lid member 2d, respectively. The master gear shaft 10 is coupled to the handle assembly 1 while being unitarily rotatable therewith.

The pinion gear 12 has a tubular shape. A front portion 12a of the pinion gear 12 is extended towards the spool 4 while penetrating the through hole 3e of the rotor 3. The rotor 3 is fixed to the front portion 12a of the pinion gear 12 by a nut 13. The rotor 3 is thereby unitarily rotatable with the pinion gear 12. The pinion gear 12 is rotatably supported by the reel body 2a through bearings 14a and 14b. Specifically, an intermediate part of the pinion gear 12 is supported by a bearing 14a, whereas a rear part of the pinion gear 12 is supported by a bearing 14b. Further, the front end of the pinion gear 12 is supported by a bearing 14c. The nut 13 is prevented from being loosened by a retainer 36. Further, the nut 13 indirectly makes contact with the spool shaft 8 through a bearing 13a. Accordingly, a space is produced between the inner peripheral surface of the pinion gear 12 and the outer peripheral surface of the spool shaft 8.

The oscillation mechanism 20 is of a traverse cam type. The oscillation mechanism 20 includes an intermediate gear 20a, a helical shaft 20b, and a slider 20c. The intermediate gear 20a is meshed with the pinion gear 12. The helical shaft 20b is attached to the reel body 2a while being rotatable about an axis arranged parallel to the spool shaft 8. The slider 20c is configured to move back and forth in conjunction with rotations of the helical shaft 20b. The rear end of the spool shaft 8 is attached to the slider 20c. The spool shaft 8 is thereby prevented from rotating and axially moving.

Lever Brake Mechanism Structure

Figure 2:
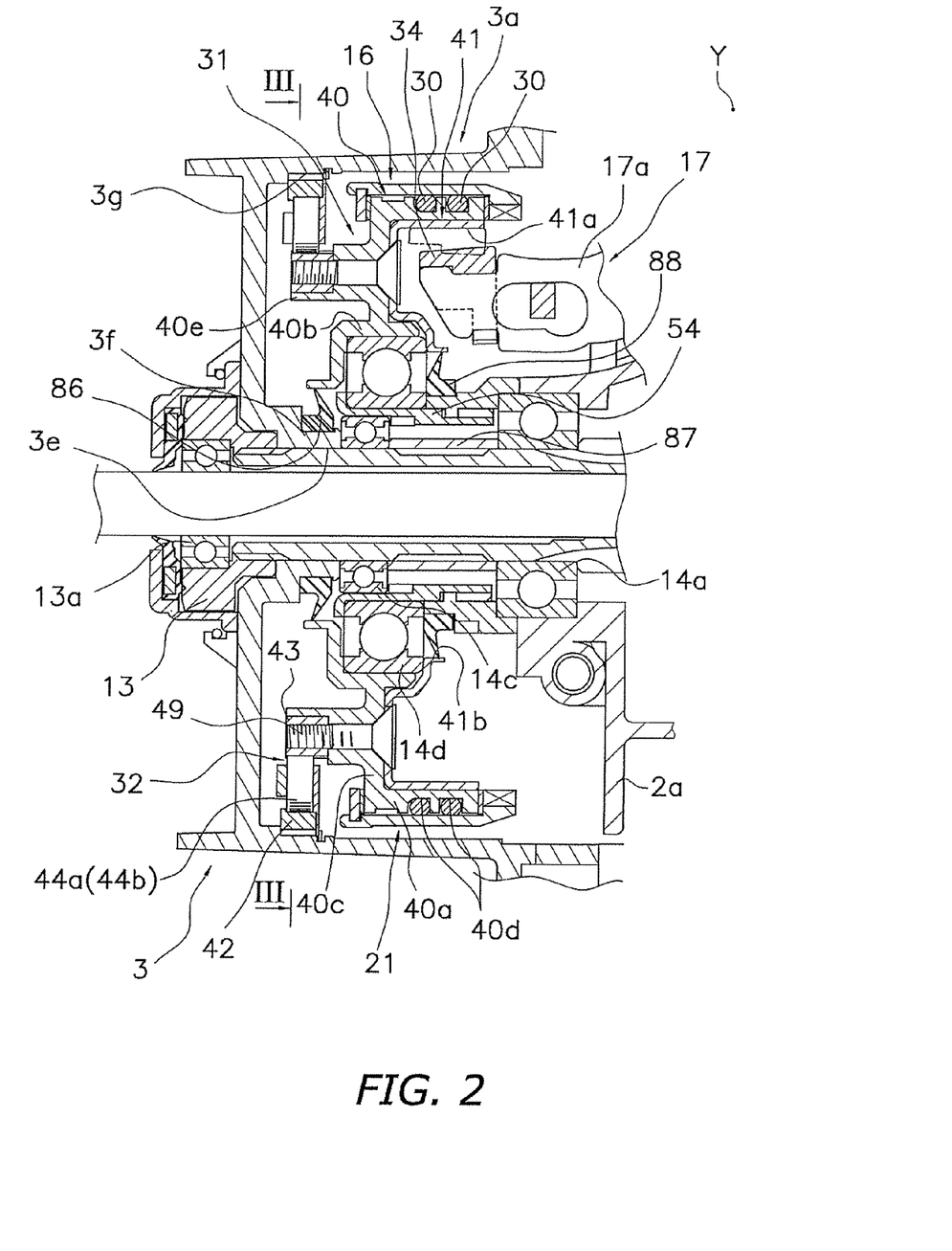
FIG. 2 is a partial cross-sectional side view of a lever brake mechanism of the spinning reel.

The lever brake mechanism 6 is a rotor brake device of the exemplary embodiment of the present invention. As illustrated in FIGS. 1 and 2, the lever brake mechanism 6 includes a brake unit 16, the brake lever 17, a spring member 19, and a predetermined-brake-force switcher 21. The brake lever 17 is operated for regulating braking force of the brake unit 16. The spring member 19, in a form of a coil spring, is configured to urge the brake lever 17. The predetermined-brake-force switcher 21 is configured to switch between a predetermined brake activated state and a brake deactivated state in conjunction with the brake lever 17. The spring member 19 is configured to urge the brake lever 17 in a direction away from the fishing rod attachment 2c.

Brake Unit Structure

As illustrated in FIG. 2, the brake unit 16 includes a brake unit body 31 and a one-way clutch 32. The brake unit body 31 includes a brake surface 41a. The brake surface 41a is configured to be braked when the brake lever 17 is pressed thereon. The one-way clutch 32 is a roller clutch configured to couple/uncouple the rotor 3 and the brake unit body 31 in accordance with the rotational direction of the rotor 3.

The brake unit body 31 includes a tubular member 40 and a brake cylinder 41. The tubular member 40 is disposed on the inner peripheral side of the cylinder 3a of the rotor 3 while being coaxial to the rotor 3. The brake cylinder 41 is fixed to the inner peripheral surface of the tubular member 40.

As illustrated in FIG. 2, the tubular member 40 is a double-nested tubular member including an outer tubular portion 40a, an inner tubular portion 40b, and a disc portion 40c. The outer tubular portion 40a is disposed on the inner peripheral side of the cylinder 3a while being coaxial to the cylinder 3a. The inner tubular portion 40b is disposed on the inner peripheral side of the outer tubular portion 40a. The disc portion 40c connects the outer tubular portion 40a and the inner tubular portion 40b. The outer tubular portion 40a includes a single or plurality of (e.g., two) annular grooves 40d on the outer peripheral surface thereof. The annular grooves 40d are separated at a predetermined interval in the axial direction of the outer tubular portion 40a. A single or plurality of friction rings 30 (e.g., two), which form a part of the predetermined-brake-force switcher 21, are fitted into the annular grooves 40d, respectively. The inner tubular portion 40b is rotatably supported through a bearing 14d on the outer peripheral surface of a bearing retainer ring 54 fixed to the attachment member 2e. The inner tubular portion 40b is further extended radial-inwards on the front side of the bearing 14d. The radial-inwardly extended end of the inner tubular portion 40d is further axially extended in a tubular shape. The axially extended tubular part of the inner tubular portion 40d is disposed on the outer peripheral side of the boss 3f while being opposed to the boss 3f. A sealing member 86 made of elastic material is fitted between the boss 3f and the opposed part (i.e., the axially extended tubular part) of the inner tubular portion 40b. Accordingly, liquid is prevented from easily entering the inside of the bearing 14c, the bearing 14d, and the reel unit 2 through the space between the tubular member 40 and the boss 3f of the rotor 3.

The bearing retainer ring 54 is screwed into the tip inner periphery of the attachment member 2e. The bearing 14c is disposed radially between the bearing retainer ring 54 and the pinion gear 12. The bearing 14c serves to support the pinion gear 12 and simultaneously retain the bearing retainer ring 54. A tubular bearing collar 87 is disposed axially between the bearing 14c and the bearing 14a. The rear part of the bearing 14c is thereby set to be in an appropriate position. On the other hand, the front part of the bearing 14c is abutted to the boss 3f of the rotor 3 and is thereby set to be in an appropriate position.

The brake cylinder 41 is extended from the inner peripheral surface of the outer tubular portion 40a to the rear surface of the bearing 14d via the inner tubular portion 40b. Therefore, the outer race of the bearing 14d is axially held by the tubular member 40 and the brake cylinder 41. A part of the brake cylinder 41, which is disposed along the outer tubular portion 40a, has an inner peripheral surface functioning as the brake surface 41a. The brake cylinder 41 is a metal closed-end tubular member including a center hole 41b. The brake cylinder 41 is fixed to the disc portion 40c by fixation bolts 49. The center hole 41b has a tubular shape and is therefore opposed to the outer periphery of the attachment member 2e. The tip of the brake lever 17 is abutted to the brake surface 41a of the brake cylinder 41 for braking the tubular member 40. A sealing member 88, made of elastic material, is fitted between the attachment member 2e and the center hole 41b of the brake cylinder 41. Liquid is thereby prevented from entering the bearing 14d. Therefore, liquid is further prevented from entering the inside of the reel unit 2 through the bearing 14d.

The one-way clutch 32 is a roller clutch of an outer race rotating type. The one-way clutch 32 is configured to couple the rotor 3 and the tubular member 40 of the brake unit body 31 only when the rotor 3 rotates in the fishing line release direction. Accordingly, the tubular member 40 is rotated in the fishing line release direction in conjunction with the rotor 3. By contrast, the rotor 3 and the tubular member 40 are uncoupled when the rotor 3 is rotated in a fishing line winding direction. In other words, rotation is not transmitted from the rotor 3 to the tubular member 40.

Figure 3:
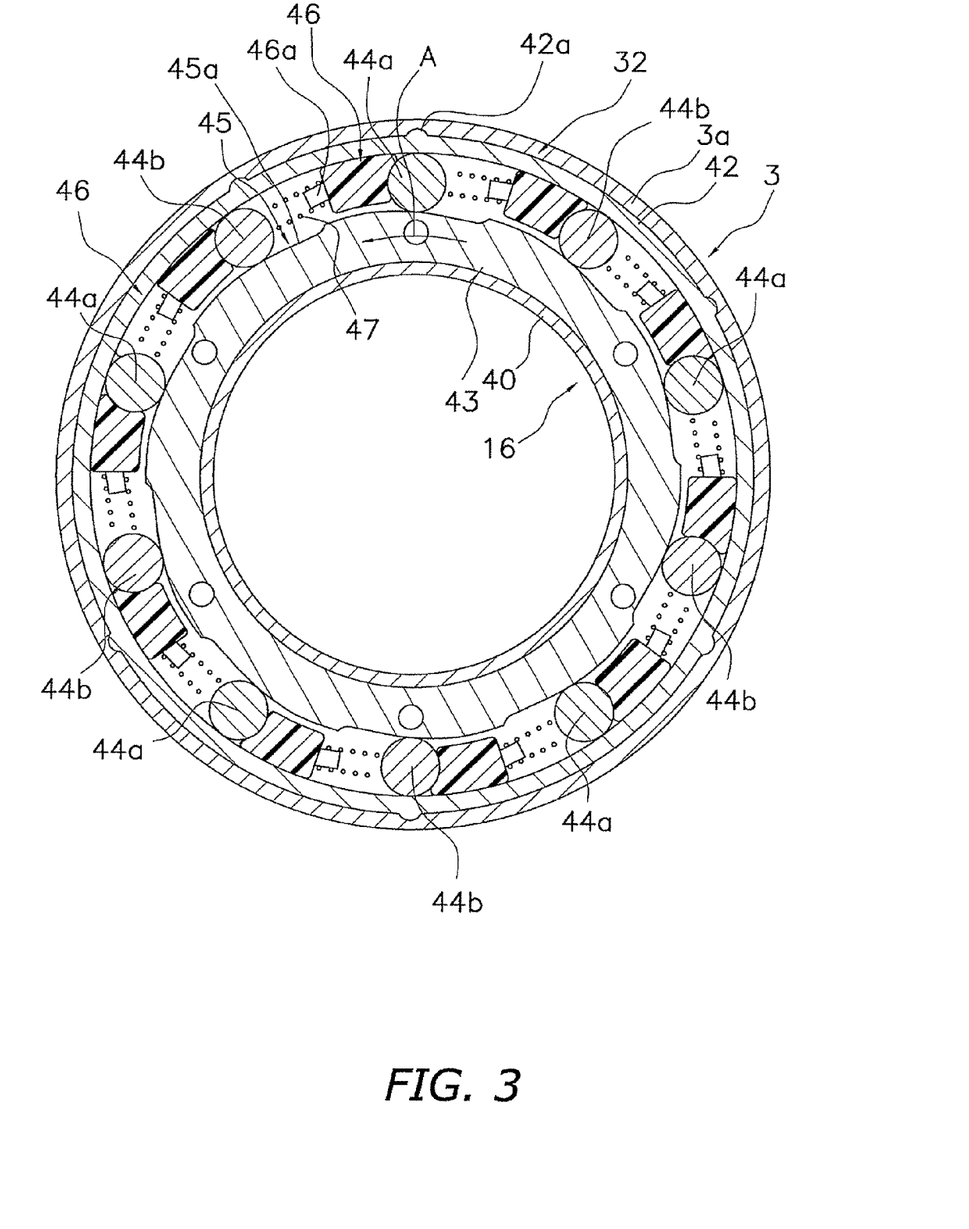
FIG. 3 is a cross-sectional front view of a one-way clutch of the spinning reel.

As illustrated in FIGS. 2 and 3, the one-way clutch 32 includes an outer race 42, an inner race 43, first rollers 44a, second rollers 44b, and a cam surface 45. The outer race 42 is a ring-like member. The outer race 42 is coupled to an inner peripheral surface 3g of the cylinder 3a of the rotor 3 (an example of a first component). The outer race 42 is thereby unitarily rotatable with the rotor 3. The outer race 42 includes a plurality of locking protrusions 42a on the outer peripheral surface thereof. The locking protrusions 42a are slightly protruded radial outwards while being circumferentially disposed at irregular intervals.

The inner race 43 is a ring-like member fixed to the disc portion 40c of the tubular member 40 of the brake unit 16 (an example of a second component) by the fixation bolts 49 fixing the brake cylinder 41 to the disc portion 40c. More specifically, the inner race 43 is attached to the outer peripheral surface of an axis aligning tubular portion 40e that is formed on the disc portion 40c for aligning the axis of the inner race 43.

A single or plurality of the first rollers 44a (i.e., components hatched with left-to-right downward lines in FIG. 3) and a single or plurality of the second rollers 44b (i.e., components hatched with right-to-left downward lines in FIG. 3) are contactable with both of the outer race 42 and the inner race 43. In the first exemplary embodiment, five first rollers 44a and five second rollers 44b are circumferentially disposed at predetermined intervals in an alternate manner. The first rollers 44a are made of, for instance, β titanium alloy. On the other hand, the second rollers 44b are made of, for instance, stainless alloy (e.g., SUS440C). The cam surface 45 includes a plurality of engaging surface sections 45a circumferentially formed on the outer peripheral surface of the inner race 43. In each stuck surface sections 45a, distance from the center of the inner race 43 is gradually increased along the circumferential direction of the inner race 43. Each first roller 44a has a coefficient of friction greater than that of each second roller 44b. Specifically, β titanium alloy is more elastically deformed than stainless alloy due to Young's modulus thereof less than that of stainless alloy. Contact area is increased between each first roller 44a and the cam surface 45 due to elastic deformation of β titanium alloy. Accordingly, each first roller 44a has an apparent coefficient of friction greater than that of each second roller 44b.

In the first exemplary embodiment, the cam surface 45 is formed on the outer peripheral surface of the inner race 43. The cam surface 45 includes the plurality of stuck surface sections 45a. Each stuck surface section 45a has a radius gradually increased along the circumferential direction of the inner race 43 about the center of the inner race 43.

Further, the one-way clutch 32 includes a retainer 46 for circumferentially disposing the first rollers 44a and the second rollers 44b at predetermined intervals. The retainer 46 includes a plurality of (e.g., 10) protrusions 46a. Each protrusion 46a is disposed adjacent to the first and second rollers 44a and 44b between the first and second rollers 44a and 44b. Further, a plurality of (e.g., 10) spring members 47 is attached to the retainer 46a for urging the first and second rollers 44a and 44b in a clutch-on (coupling) direction. Each spring member 47 is disposed between each first roller 44a and a corresponding one of the protrusions 46a adjacent thereto and between each second roller 44b and a corresponding one of the protrusions 46a adjacent thereto.

When the rotor 3 is rotated in the fishing line winding direction, the first rollers 44a and the second rollers 44b are configured to move along a clutch-off direction (i.e., clockwise direction in FIG. 3) against the urging force of the spring members 47. Accordingly, the first rollers 44a and the second rollers 44b are set to be in clutch-off states without making contact with the cam surface 45. Therefore, rotations of the rotor 3 in the fishing line winding direction are not transmitted to the brake unit body 31.

When the rotor 3 is rotated in the fishing line release direction, on the other hand, the inner race 43 is rotated in the fishing line release direction depicted with an arrow A in FIG. 3. The first rollers 44a and the second rollers 44b are rolled in the same direction by the urging force of the spring members 47. The first rollers 44a and the second rollers 44b thereby get stuck between the cam surface 45 and the outer race 42. In this case, the coefficient of friction of each first roller 44a is greater than that of each second roller 44b. The first rollers 44a are therefore prevented from easily slipping and are promptly set to be in clutch-on states. Rotations of the rotor 3 in the fishing line release direction are thereby transmitted to the brake unit body 31.

Brake Lever Structure

As illustrated in FIG. 1, the brake lever 17 is supported by a support shaft 33 attached to the leg 2b of the reel unit 2 along a second axis Y. The brake lever 17 is thereby allowed to pivot about the second axis Y. The second axis Y is herein roughly perpendicular to the first axis seen from above. Further, the brake lever 17 is urged by the spring member 19 in a direction away from the fishing rod attachment 2c, as described above.

As described above, the leg 2b includes the attachment groove 2c on the front surface thereof. The sheet member 7 is prevented from being detached from the attachment groove 2g by the support shaft 33.

As illustrated in FIG. 1, the brake lever 17 is attached to the reel unit 2 while being rotatable between a predetermined braking position depicted with a dashed dotted line and a braking position depicted with a dashed two-dotted line. The predetermined braking position is closer to the fishing rod attachment 2c than an unbraking position is. The mechanism, which is formed by the spring member 19 and the predetermined-brake-force switcher 21, normally keeps the brake lever 17 in either the predetermined braking position depicted with the dashed dotted line or the unbraking position depicted with a solid line in FIG. 1.

The brake lever 17 includes an operating portion 17a, an attachment portion 17b, and a brake acting portion 17c. The operating portion 17a is operated to apply braking force. The attachment portion 17b is supported by the support shaft 33 in the attachment groove 2g of the leg 2b while being pivotable about the second axis Y. The brake acting portion 17c is extended from the attachment portion 17b for applying braking force to the brake unit 16.

The operating portion 17a is a member manufactured by forging of, for instance, aluminum alloy. The operating portion 17a is detachably coupled to the attachment portion 17b by a plurality of (e.g., two) bolt members 90.

The attachment portion 17b and the brake acting portion 17c are integrally formed in a C-curved shape as a single plate member made of stainless alloy. The attachment portion 17b is disposed in the space enclosed by the sheet member 7. The attachment portion 17b is thereby prevented from making contact with the leg 2b. Therefore, galvanic corrosion is prevented from occurring in the reel unit 2 made of magnesium alloy.

The tip of the brake acting portion 17c is opposed to the inner periphery of the brake cylinder 41. As illustrated in FIG. 2, a brake shoe 34 is detachably attached to the tip of the brake acting portion 17c. The brake shoe 34 is configured to make contact with the inner peripheral surface of the brake cylinder 41.

The brake shoe 34 is made of synthetic resin having an elastic property (e.g., polyamide synthetic resin or polyacetal). As illustrated in FIG. 2, the brake shoe 34 is configured to press the brake cylinder 41 radial outwards in conjunction with a pivot of the brake lever 17.

Without being particularly operated, the brake lever 17 is configured to be urged by the spring member 19. The brake lever 17 is thereby set to be in the unbraking position as depicted with the solid line in FIG. 1. Under the condition, the brake shoe 34 is kept separated away from the brake cylinder 41.

The spring member 19 is disposed between the attachment portion 17b and the leg 2b of the reel unit 2 in a compressed state while being contained in the sheet member 7. The spring member 19 urges the brake lever 17 towards the unbraking position in the counterclockwise direction in FIG. 1. Therefore, the rotor 3 is set to be in the brake deactivated state when an angler releases the brake lever 17 out of his/her hand while the rotor 3 is set to be in the brake activated state.

Reel Actions and Operation

In casting, the bail arm 9 is flipped to the fishing line release position. When an angler casts with the fishing rod under the condition, the fishing line is reeled out of the outer periphery of the spool 4. In winding the fishing line, the handle assembly 1 is rotated in the fishing line winding direction. In response to this, a return mechanism (not illustrated in the figures) causes the bail arm 9 to return to the fishing line winding position. Torque of the handle assembly 1 is transmitted to the pinion gear 12 via the master gear shaft 10 and the master gear 11. The torque transmitted to the pinion gear 12 is further transmitted to the rotor 3 through the front portion 12a of the pinion gear 12. The rotor 3 is herein rotated in the fishing line winding direction. The one-way clutch 32 is thereby set to be in the clutch-off state. In other words, torque of the rotor 3 is prevented from being transmitted to the tubular member 40. When the pinion gear 12 is rotated, the spool shaft 8 is reciprocated back and forth.

Without being particularly operated, the brake lever 17 is pressed by the actions of the spring member 19 and the predetermined-brake-force switcher 21. The brake lever 17 is thereby set to be in either the unbraking position or the predetermined braking position.

When dealing with movement of a hooked fish by reversely rotating the rotor 3, an angler is allowed to regulate braking force by pulling the brake lever 17 towards the fishing rod attachment 2c with his/her index finger, for instance.

When the hooked fish pulls the fishing line, the rotor 3 is rotated in the fishing line release direction and the one-way clutch 32 is thereby set to be in the clutch-on state. Torque of the rotor 3 is herein transmitted to the tubular member 40 and is further transmitted to the brake cylinder 41. Under the condition, the lever brake mechanism 6 is allowed to brake rotations of the rotor 3. In the one-way clutch 32, the first rollers 44a and the second rollers 44b move along the cam surface 45 and get stuck between the outer race 42 and the cam surface 45 when the rotor 3 is rotated in the fishing line release direction. The inner race 43 and the outer race 42 are thereby locked. In other words, the clutch-on state is produced and rotations of the rotor 3 are transmitted to the brake cylinder 41.

Second Exemplary Embodiment

A second exemplary embodiment exemplifies a case that a one-way clutch of an inner race rotating type of the present invention is used for an anti-reverse mechanism 150 configured to permit or prevent reverse rotations of a rotor 103 of a front drag spinning reel.

Figure 4:
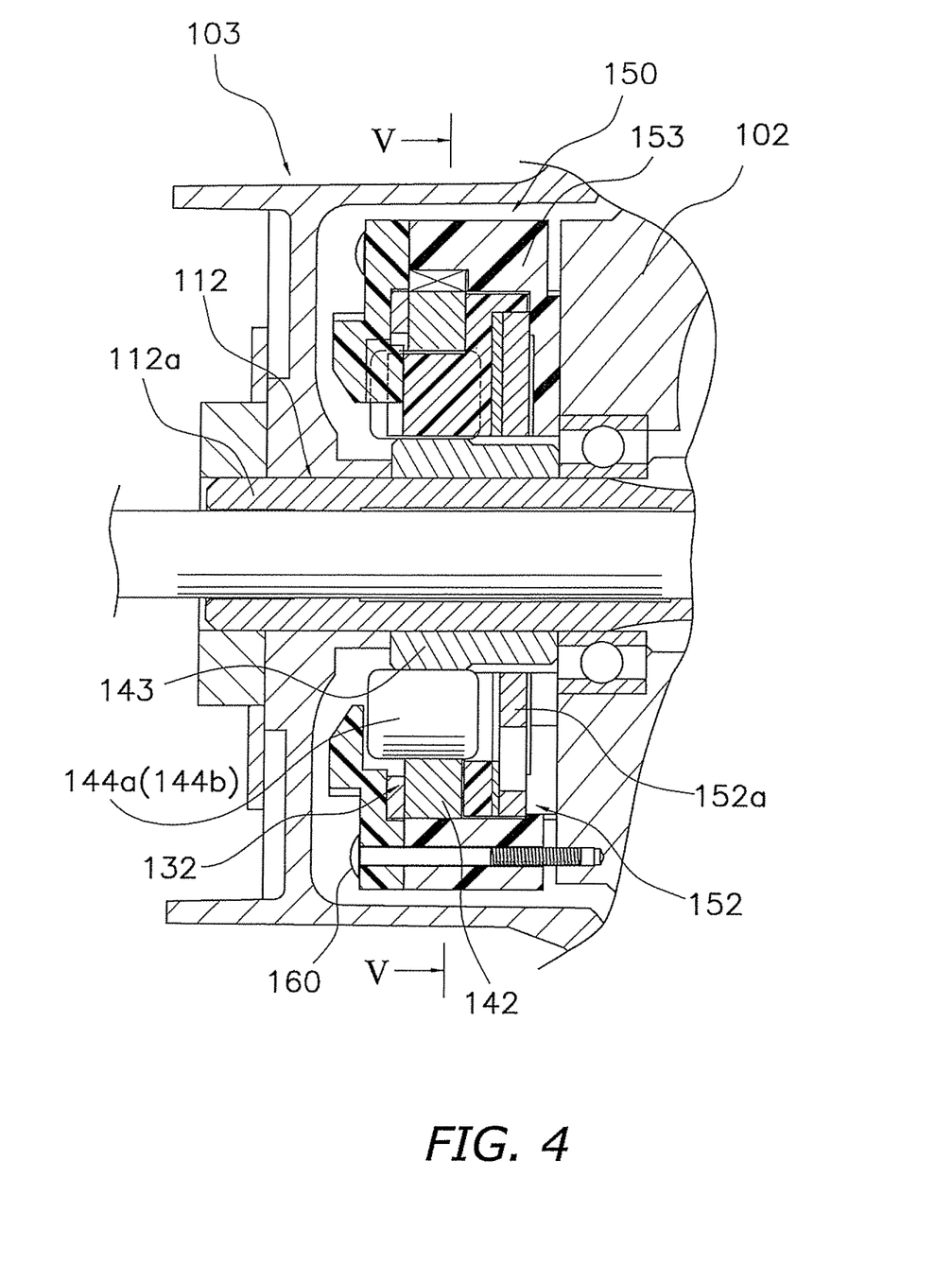
FIG. 4 is a partial cross-sectional side view of an anti-rotation mechanism of a spinning reel adopting a second exemplary embodiment of the present invention.
Figure 5:
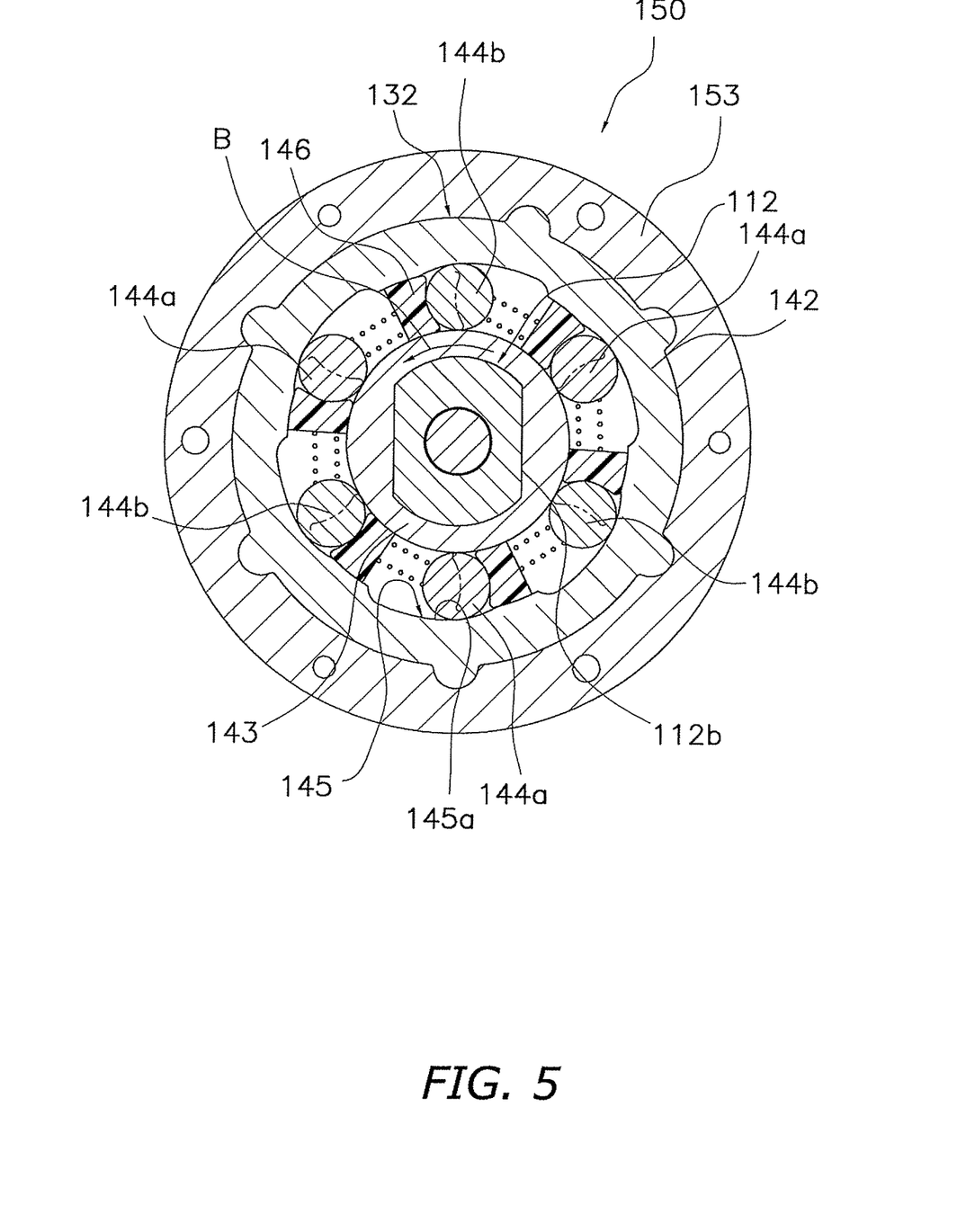
FIG. 5 is a cross-sectional front view of a one-way clutch of the spinning reel of the second exemplary embodiment.

In FIG. 4, the anti-reverse mechanism 150 includes a roller-type one-way clutch 132 and a switch mechanism 152. The switch mechanism 152 is configured to switch the one-way clutch 132 between a reverse rotation permission state and a reverse rotation prevention state. As illustrated in FIG. 5, the one-way clutch 132 includes an outer race 142, an inner race 143, first rollers 144a, second rollers 144b, a cam surface 145 and a retainer 146. The outer race 142 is fitted to a reel unit 102 (i.e., the first component) through a clutch case 153. The inner race 143 is fitted onto a pinion gear 112 (i.e., the second component).

The clutch case 153 is fixed to the front part of the reel unit 102 by screw members 160. The outer race 142 is non-rotatably attached to the clutch case 153. The inner race 143 is coupled to an anti-rotation portion 112b (including two parallel faces) formed on the pinion gear 112 while being unitarily rotatable therewith. A front portion 112a of the pinion gear 112 is fixed to the rotor 103. The pinion gear 112 is thereby unitarily rotatable with the rotor 103. The first rollers 144a and the second rollers 144b are disposed between the outer race 142 and the inner race 143 while being contactable with the outer race 142 and the inner race 143. In the second exemplary embodiment, the cam surface 145 is formed on the inner peripheral surface of the outer race 142. Similarly to the first exemplary embodiment, each first roller 144a is made of β titanium alloy, whereas each second roller 144b is made of stainless alloy. The outer diameter of each first roller 144a is greater than that of each second roller 144b. Specifically, the outer diameter of each first roller 144a is in a range of 100.5-102.5% of the outer diameter of each second roller 144b. The cam surface 145 includes a plurality of stuck surface sections 145a. In each stuck surface section 145a, radius about the center of the outer race 142 is gradually reduced along the circumferential direction of the outer race 142. The retainer 146 is engaged with the switch mechanism 152. As illustrated in FIG. 5, the switch mechanism 152 is configured to circulate the retainer 146 between a reverse rotation prevention position depicted with a solid line and a reverse rotation permission position depicted with a dashed two-dotted line.

The switch mechanism 152 includes a cam plate 152a and a switch lever (not illustrated in the figures). The cam plate 152 includes a cam groove for circulating the retainer 146. The switch lever is disposed at the lower part of the reel unit 2. In conjunction with an operation of the switch lever, the switch mechanism 152 is configured to circulate the retainer 146 between the reverse rotation permission position and the reverse rotation prevention position through the cam plate 152a. Accordingly, the one-way clutch 132 is switched between the reverse rotation permission state and the reverse rotation prevention state.

In the anti-reverse mechanism 150 with the aforementioned structure, the inner race 143 of the one-way clutch 132 is supposed to rotate in the fishing line release direction depicted with an arrow B in FIG. 5 through the pinion gear 112 when the rotor 103 is rotated in the fishing line release direction under the reverse rotation prevention state. However, the first rollers 144a and the second rollers 144b get stuck with the stuck surface sections 145a. The inner race 143 and the outer race 142 are thus locked, and the rotor 103 is promptly prevented from reversely rotating. Similarly to the aforementioned exemplary embodiment, the first rollers 144a are herein prevented from easily slipping.

Third Exemplary Embodiment

A third exemplary embodiment exemplifies a one-way clutch configured to activate a drag mechanism by preventing reverse rotations of a handle shaft of a dual-bearing reel.

Figure 6:
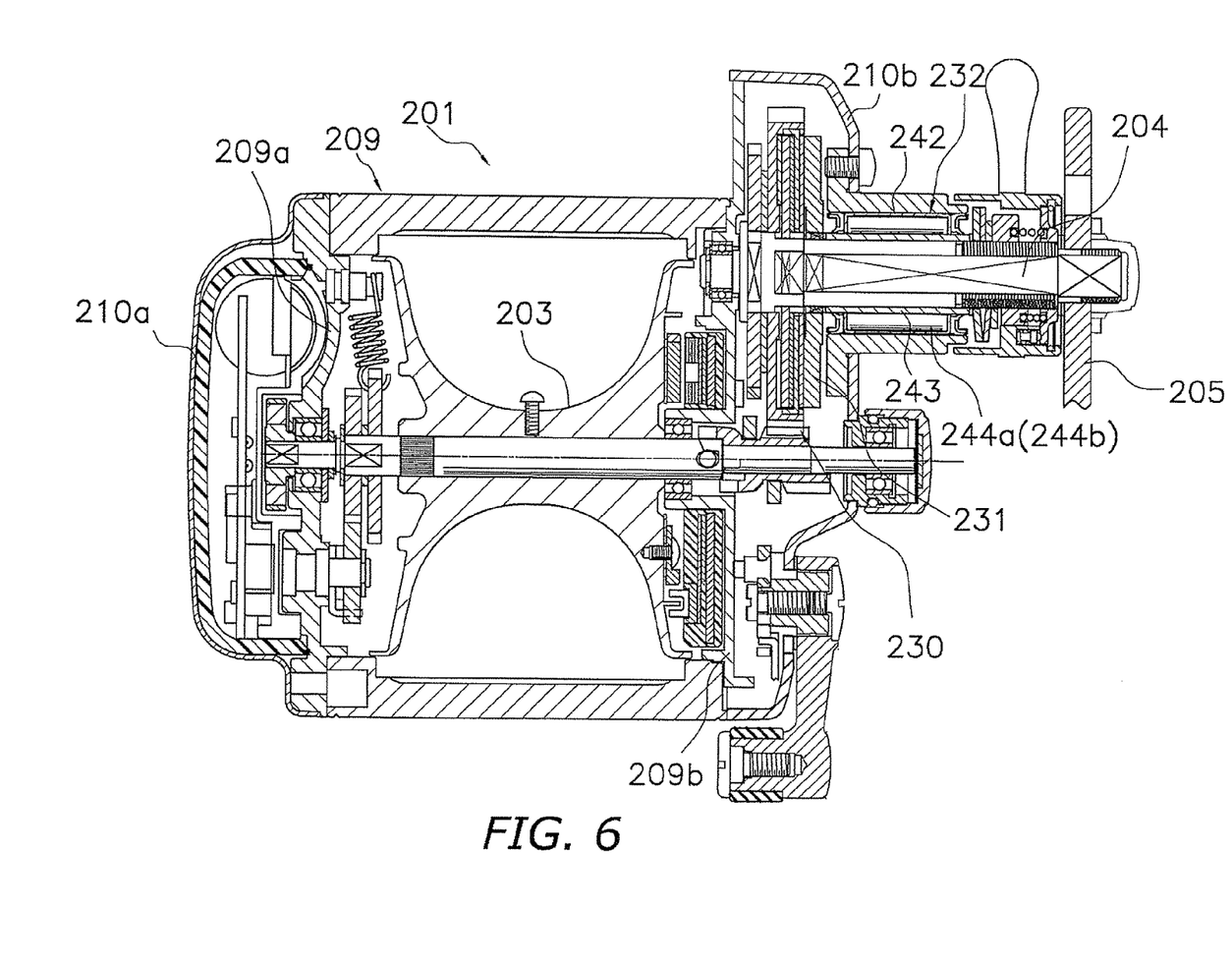
FIG. 6 is a cross-sectional plan view of a dual-bearing reel adopting a third exemplary embodiment of the present invention.

In FIG. 6, the dual-bearing reel of the third exemplary embodiment includes a reel unit 201, a spool 203, a handle shaft 204, and a handle 205. The spool 203 is rotatably attached to the reel unit 201 for winding the fishing line thereon. The handle shaft 204 is rotatably attached to a lateral part of the reel unit 201. The handle 205 is attached to the distal end of the handle shaft 204.

The reel unit 201 includes a frame 209, a first side cover 210a, and a second side cover 210b. The frame 209 includes a first side plate 209a and a second side plate 209b. The first and second side covers 210a and 210b cover the both lateral sides of the frame 209.

The spool 203 is disposed between the first side plate 209a and the second side plate 209b. The spool 203 is coupled to the handle shaft 204 through a rotation transmission mechanism 230. The rotation transmission mechanism 230 includes a drag mechanism 231 configured to brake rotations of the spool 203 in the fishing line release direction.

The handle shaft 204 is rotatably supported by the second side cover 210b and the second side plate 209b. A one-way clutch 232 is disposed on the outer peripheral side of the handle shaft 204 within the second side cover 210b.

The one-way clutch 232 is a roller clutch of an inner race rotating type. The structure of the one-way clutch 232 is similar to that of the one-way clutch illustrated in FIG. 5. The one-way clutch 232 is provided for activating the drag mechanism 231 by preventing rotations of the handle shaft 204 in the fishing line release direction. In the one-way clutch 232, an outer race 242 is non-rotatably engaged with the second side cover 210b of the reel unit 201 (i.e., the first component). An inner race 243 is coupled to the handle shaft 204 (i.e., the second component) while being unitarily rotatable therewith. First rollers 244a and second rollers 244b are alternately disposed between the outer race 242 and the inner race 243. The first and second rollers 244a and 244b are needle-like rollers. The outer diameter of each first roller 244a is the same as that of each second roller 244b.

The one-way clutch 232 with the aforementioned structure is configured to instantly prevent rotations of the handle shaft 204 in the fishing line release direction for activating the drag mechanism 231 when a fish is caught on a tackle of the fishing line and the spool 203 is accordingly rotated in the fishing line release direction.

The one-way clutch 232 with the aforementioned structure can also achieve advantageous effects similar to those of the first and second exemplary embodiments.

Fourth Exemplary Embodiment

A fourth exemplary embodiment exemplifies a one-way clutch configured to activate a drag mechanism of a single-bearing reel.

Figure 7:
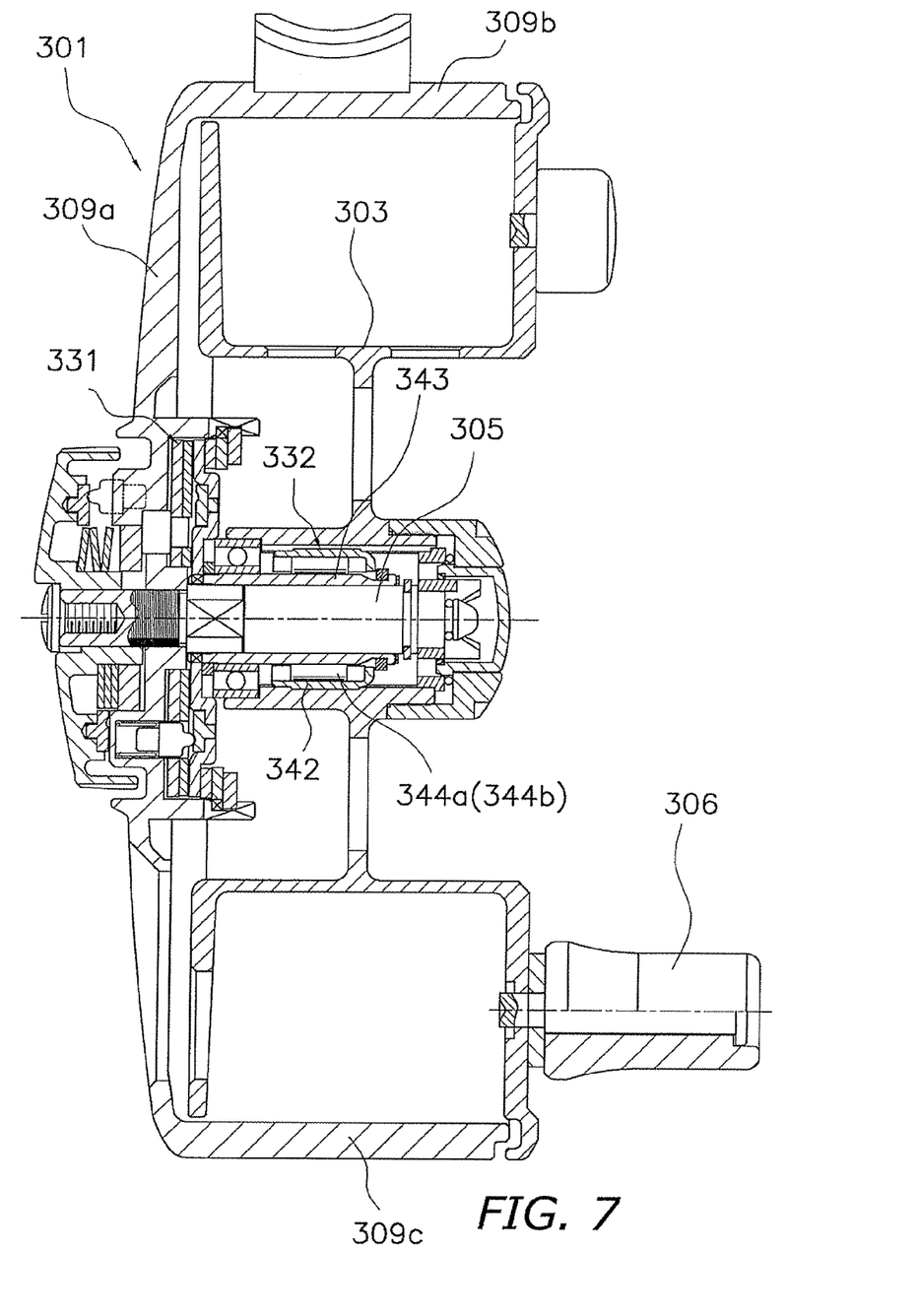
FIG. 7 is a cross-sectional front view of a single-bearing reel adopting a fourth exemplary embodiment of the present invention.

As illustrated in FIG. 7, the single-bearing reel includes a reel unit 301 and a spool 303. The spool 303 is rotatably attached to the reel unit 301.

The reel unit 301 includes a circular side plate 309a, a top protection portion 309b and a bottom protection portion 309c. The top and bottom protection portions 309a and 309b are extended from the opposed outer peripheral parts of the side plate 309a. A spool shaft 305 is fixed to the center part of the side plate 309a.

A drag mechanism 331 is disposed radial outwards of the spool shaft 305 on the inner surface of the side plate 309a.

The spool 303 is rotatably supported by the spool shaft 305. A one-way clutch 332 is attached between the spool 303 and the spool shaft 305. A handle knob 306 is attached to the outer surface of the spool 303.

The one-way clutch 332 is a roller clutch of an inner race rotating type and has a structure similar to that of the one-way clutch illustrated in FIG. 5. The one-way clutch 332 is provided for activating the drag mechanism 331 by transmitting rotations of the spool 303 to the drag mechanism 331 when the spool 303 is rotated in the fishing line release direction. In the one-way clutch 332, an outer race 342 is non-rotatably engaged with the inner peripheral surface of the spool 303 (i.e., the first component). An inner race 343 is coupled to the drag mechanism 331 (i.e., the second component) while being unitarily rotatable therewith. First rollers 344a and second rollers 344b are alternately disposed between the outer race 342 and the inner race 343. The first and second rollers 344a and 344b are needle-like rollers. The outer diameter of each first roller 244a is the same as that of each second roller 244b.

The one-way clutch 332 with the aforementioned structure is configured to activate the drag mechanism 331 by promptly transmitting rotations of the spool 303 in the fishing line release direction to the drag mechanism 331 when a fish is caught on a tackle of the fishing line and the spool 303 is accordingly rotated in the fishing line release direction.

The one-way clutch 332 with the aforementioned structure can also achieve advantageous effects similar to those of the first to third exemplary embodiments.

Features (A) The one-way clutch 32 (132, 232 or 332) is a roller-type one-way clutch to be used for a fishing reel. The one-way clutch 32 (132, 232 or 332) includes the outer race 42 (142, 242 or 342), the inner race 43 (143, 243 or 343), the first rollers 44*a* (144*a*, 244*a* or 344*a*), the second rollers 44*b* (144*b*, 244*b* or 344*b*) and the cam surface 45 (145).

The outer race 42 is engaged with the first component of the fishing reel (the rotor 3, the reel unit 102, the reel unit 201 or the spool 303). The inner race 43 is engaged with the second component of the fishing reel (the brake unit 16, the pinion gear 112, the handle shaft 204 or the drag mechanism 331). The single or a plurality of first rollers 44*a* are contactable with the outer race 42 and the inner race 43 while being disposed therebetween. The single or plural second rollers 44*b* are contactable with the outer race 42 and the inner race 43 while being disposed therebetween. The first rollers 44*a* and the second rollers 44*b* are circumferentially disposed at predetermined intervals. Coefficient of friction of each first roller 44*a* is greater than that of each second roller 44*b*. The cam surface 45 is disposed on either the inner peripheral surface of the outer race 42 or the outer peripheral surface of the inner race 43. The first and second rollers 44*a* and 44*b* get stuck with the cam surface 45.

In the one-way clutch 32, two types of rollers are prepared as rollers to be disposed between the outer race 42 and the inner race 43. Further, the coefficient of friction of each first roller 44*a* is greater than that of each second roller 44*b*. In this case, the first rollers 44*a* are prevented from easily slipping when getting stuck with the cam surface 45 due to its high coefficient of friction. Further, the slippery second rollers 44*b* with a low coefficient of friction are herein provided. Therefore, chances are reduced that an angler is required to strongly rotate the handle assembly 1 (or the handle shaft 204) under the clutch-off state. Consequently, an angler is inhibited from having a feeling of unsmooth handle rotations. Yet further, high-strength rollers with a low coefficient of friction can be used as the second roller 44*b*. Therefore, it is possible to inhibit reduction in strength of the entire rollers as much as possible.

(B) In the one-way clutch 132, the outer diameter of each first roller 144*a* is greater than that of each second roller 144*b*. More specifically, the outer diameter of each first roller 144*a* with a high coefficient of friction is greater than that of each second roller 144*b*. Therefore, the non-slippery first rollers 144*a* reliably get stuck with the cam surface 145 before the second rollers 144*b* get stuck with the cam surface 145. In other words, the one-way clutch 132 is further promptly activated and the first rollers 144*a* are prevented from easily slipping. Further, inclusion of inappropriate roller/rollers can be prevented in assembling the one-way clutch 132 due to the size difference between the first rollers 144*a* and the second rollers 144*b*.

(C) In the one-way clutch 132, the outer diameter of each first roller 144*a* is in a range of 100.5-102.5% of the diameter of each second roller 144*b*. In this case, there is small difference between the diameter of each first roller 144*a* and that of each second roller 144*b*. Therefore, the second rollers 144*b* easily get stuck with the cam surface 145 after the first rollers 144*a* get stuck with the cam surface 145.

(D) In the one-way clutch 32 (132, 232 or 332), the Young's modulus of each first roller 44*a* (144*a*, 244*a* or 344*a*) is less than that of each second roller 44*b* (144*b*, 244*b* or 344*b*). Therefore, the first rollers 44*a* (144*a*, 244*a* or 344*a*) are elastically deformed to a great extent. Due to the elastic deformation, contact area is increased between each first roller 44*a* (144*a*, 244*a* or 344*a*) and the cam surface. This increases apparent coefficient of friction of each first roller 44*a* (144*a*, 244*a* or 344*a*).

In this case, the coefficient of friction of each first roller 44*a* (144*a*, 244*a* or 344*a*) is greater than that of each second roller 44*b* (144*b*, 244*b* or 344*b*) not due to the actual coefficient of friction but due to the apparent coefficient of friction affected by the elastic deformation. Therefore, a high coefficient of friction can be obtained even when a material with a high tensile strength (e.g., metal) is used.

(E) In the one-way clutch 32 (132, 232 or 332), each first roller 44*a* (144*a*, 244*a* or 344*a*) is made of β titanium alloy, whereas each second roller 44*b* (144*b*, 244*b* or 344*b*) is made of stainless alloy.

In this case, highly anti-corrosive alloy is used. Therefore, the first and second rollers are prevented from being easily corroded even when the coefficient of friction of each first roller is different from that of each second roller.

(F) In the one-way clutch 32, the cam surface 45 includes the engaging surface sections 45*a* on the outer peripheral surface of the inner race 43. In each of engaging surface section 45*a*, radius about the center of the inner race 43 is gradually increased along the circumferential direction of the inner race 43. The outer race 42 includes a cylindrical inner peripheral surface. In this case, the first rollers 44*a* are prevented from easily slipping in the one-way clutch of an outer race rotating type.

(G) In the one-way clutch 132, the cam surface 145 includes the stuck surface sections 145*a* on the inner peripheral surface of the outer race 142. In each stuck surface section 145*a*, radius about the center of the outer race 142 is gradually reduced along the circumferential direction of the outer race 142. The inner race 143 includes a cylindrical outer peripheral surface. In this case, the first rollers 144*a* (244*a*, 344*a*) are prevented from easily slipping in the one-way clutch 132 (232, 332) of an inner race rotating type.

(H) The fishing reel including the one-way clutch 32 is a spinning reel configured to reel out the fishing line in a direction intersecting with the fishing line winding direction of the spool 4. The outer race 42 is engaged with the rotor 3 as the first component of the spinning reel, whereas the inner race 43 is engaged with the brake unit 16 of the rotor 3 as the second component of the spinning reel.

In this case, the first rollers 44*a* are prevented from easily slipping in the one-way clutch 32 for the lever brake spinning reel configured to transmit only rotations of the rotor 3 in the fishing line release direction to the brake unit 16 of the rotor 3.

(I) The fishing reel including the one-way clutch 132 is a spinning reel configured to reel out the fishing line in a direction intersecting with the fishing line winding direction of the spool. The outer race 142 is engaged with the reel unit 102 as the first component of the spinning reel, whereas the inner race 143 is engaged with the pinion gear 112 as the second component of the spinning reel.

In this case, the first rollers 144*a* are prevented from easily slipping in the one-way clutch 132 configured to prevent reverse rotations of the rotor 103 for the spinning reel of either a front drag type or a rear drag type.

(J) The fishing reel including the one-way clutch 232 is a dual-bearing reel configured to reel out the fishing line in the rotational direction of the spool 203. The outer race 242 is engaged with the reel unit 201 as the first component of the dual-bearing reel, whereas the inner race 243 is engaged with the handle shaft 204 as the second component of the dual-bearing reel.

In this case, the first rollers 244a are prevented from easily slipping in the one-way clutch 232 configured to activate the drag mechanism 231 for braking the spool 203 of the dual-bearing reel.

(K) The fishing reel including the one-way clutch 332 is a single-bearing reel configured to reel out the fishing line in the rotational direction of the spool 303. The outer race 342 is engaged with the spool 303 as the first component of the single-bearing reel, whereas the inner race 343 is engaged with the drag mechanism 331 as the second component of the single-bearing reel.

In this case, the first rollers 344a are prevented from easily slipping in the one-way clutch 332 configured to activate the drag mechanism 331 for braking the spool 303 of the single-bearing reel.

Other Exemplary Embodiments

Exemplary embodiments of the present invention have been described above. However, the present invention is not limited to the aforementioned exemplary embodiment and a variety of changes can be made for the present invention without departing from the scope of the present invention.

(a) In the aforementioned exemplary embodiments, the number of the first rollers and the number of the second rollers are the same, and the first and second rollers are alternately disposed. However, the configurations of the first and second rollers are not limited to the above in the present invention. The number of the first rollers may be different from the number of the second rollers. When the total number of the first and second rollers is six, for instance, the number of the first rollers (or the first rollers) may be two and the number of the second rollers (or the first rollers) may be four. In this case, a single first roller (or second roller) and two second rollers (or first rollers) may be alternately disposed.

(b) In the aforementioned exemplary embodiments, the first rollers are made of β titanium for enhancing a coefficient of friction thereof. However, innovation to enhance a coefficient of friction is not limited to material. For example, a coefficient of friction may be enhanced by surface finishing or crude processing without particularly devising material.

(c) In the aforementioned exemplary embodiments, the spinning reel, the dual-bearing reel and the single-bearing reel have been exemplified as the fishing reel. However, the application target of the present invention is not limited to the above. For example, the present invention may be applied to the electric reels or the spin cast reels.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A one-way clutch for a fishing reel, comprising:
   an outer race being engaged with a first component of the fishing reel, the first component being selected from a group consisting a rotor, a reel unit, and a spool;
   an inner race being engaged with a second component of the fishing reel, the second component being selected from a group consisting a brake unit, the pinion gear, a handle shaft, and a drag mechanism;
   a first roller being disposed between the outer ace and the inner race, the first roller being disposed to make contact with the outer race and the inner race;
   a second roller being disposed between the outer race and the inner race, the second roller being disposed to make contact with the outer race and the inner race; and
   a cam surface being disposed on either an inner peripheral surface of the outer race or an outer peripheral surface of the inner race, the cam surface being disposed to allow the first roller and the second roller to get stuck therewith,
   the first roller and the second roller being disposed at a predetermined interval in a circumferential direction of the outer race, and
   the first roller having a coefficient of friction greater than a coefficient of friction of the second roller,
   the first roller having an outer diameter greater than an outer diameter of the second roller.

2. The one-way clutch for the fishing reel according to claim 1, wherein
   the first roller has a Young's modulus less than a Young's modulus of the second roller.

3. The one-way clutch for the fishing reel according to claim 2, wherein
   the first roller is made of a β titanium alloy, and
   the second roller is made of a stainless alloy.

4. The one-way clutch for the fishing reel according to claim 1, wherein
   the cam surface includes a stuck surface section on the outer peripheral surface of the inner race,
   distance from a center of the inner race to the stuck surface section is gradually increased, and
   the outer race includes an inner peripheral surface being cylindrical.

5. The one-way clutch for a fishing reel according to claim 1, wherein
   the cam surface includes a stuck surface section on the inner peripheral surface of the outer race,
   a distance from a center of the outer race to the stuck surface section is gradually reduced, and
   the inner race includes an outer peripheral surface being cylindrical.

6. The one-way clutch for the fishing reel according to claim 1, wherein
the fishing reel is a spinning reel being configured to reel out a fishing line in a direction intersecting with a fishing line winding direction of a spool,
the first component is the rotor, and
the second component is the brake unit.

7. The one-way clutch for a fishing reel according to claim 1, wherein
the fishing reel is a spinning reel being configured to reel out a fishing line in a direction intersecting with a fishing line winding direction of a spool,
the first component is the reel unit, and
the second component is the pinion gear.

8. The one-way clutch for a fishing reel according to claim 1, wherein
the fishing reel is a dual-bearing reel being configured to reel out a fishing line in a rotational direction of a spool,
the first component is the reel unit,
the second component is the handle shaft.

9. The one-way clutch for a fishing reel according to claim 1, wherein
the fishing reel is a single-bearing reel being configured to reel out a fishing line in a rotational direction of a spool,
the first component is the spool,
the second component is the drag mechanism.

10. A one-way clutch for a fishing reel, comprising:
an outer race being engaged with a first component of the fishing reel, the first component being selected from a group consisting a rotor, a reel unit, and a spool;
an inner race being engaged with a second component of the fishing reel, the second component being selected from a group consisting a brake unit, the pinion gear, a handle shaft, and a drag mechanism;
a first roller being disposed between the outer race and the inner race, the first roller being disposed to make contact with the outer race and the inner race;
a second roller being disposed between the outer race and the inner race, the second roller being disposed to make contact with the outer race and the inner race; and
a cam surface being disposed on either an inner peripheral surface of the outer race or an outer peripheral surface of the inner race, the cam surface being disposed to allow the first roller and the second roller to get stuck therewith,
the first roller and the second roller being disposed at a predetermined interval in a circumferential direction of the outer race, and
the first roller having a coefficient of friction greater than a coefficient of friction of the second roller,
the outer diameter of the first roller being in a range of 100.5-102.5% of the outer diameter of the second roller.

* * * * *